United States Patent [19]

Schrager et al.

[11] 3,912,777

[45] Oct. 14, 1975

[54] USE OF SULFURIC ACID AS AN EXTRACTANT IN OLEFIN SULFONATION

[75] Inventors: Jerome Stanley Schrager, Cedar Grove, N.J.; Joseph Rubinfeld, Brooklyn, N.Y.; Thomas Joseph Trombone, Brooklyn, N.Y.

[73] Assignee: Colgate-Palmolive Company, New York, N.Y.

[22] Filed: Mar. 22, 1967

[21] Appl. No.: 624,982

[52] U.S. Cl. .............................. 260/504; 260/513 R
[51] Int. Cl. .......................................... C07c 143/16
[58] Field of Search............................ 260/504, 513

[56] References Cited
UNITED STATES PATENTS

| | | | |
|---|---|---|---|
| 2,865,957 | 12/1958 | Logan | 260/504 |
| 3,033,898 | 5/1962 | Bray | 260/504 |
| 3,149,063 | 9/1964 | Brunel | 260/504 X |
| 3,423,454 | 1/1969 | Marrian | 260/513 |
| 3,428,654 | 2/1969 | Rubinfeld et al. | 260/504 X |

*Primary Examiner*—Leon Zitver
*Assistant Examiner*—Leo DeCrescente

[57] ABSTRACT

An acid mix, made by reacting a long chain olefin with $SO_3$, is extracted with aqueous sulfuric acid. The sulfuric acid layer is removed and the organic layer may be treated in conventional manner, as by neutralization and hydrolysis, to produce an olefin sulfonate detergent.

14 Claims, No Drawings

USE OF SULFURIC ACID AS AN EXTRACTANT IN OLEFIN SULFONATION

This invention relates to the treatment of sulfonated olefins.

Long chain olefin sulfonates having detergent properties are well known in the art. They may be prepared, for example, by the reaction of long chain olefins, preferably alpha-olefins, with diluted $SO_3$. Typically the olefin in liquid state is brought into contact with gaseous $SO_3$ diluted with an inert gas such as air, using say about 0.8 to 1.7 mols (preferably about 1 mol) of $SO_3$ per mol of olefin, to produce an "acid mix" comprising sultones and alkenyl sulfonic acid. This acid mix is then treated to convert the sultones to long chain sulfonic acids (or their salts), e.g., hydroxyalkane sulfonic acids or alkenyl sulfonic acids, usually by basic or acidic hydrolysis. In the basic hydrolysis treatment the acid mix is neutralized, as with excess aqueous sodium hydroxide solution (e.g. to raise the pH to 9 or higher), and then heated at a temperature preferably above about 80°C, e.g., at about 100°C, or higher (e.g., 150°–200°C under superatmospheric pressure). In the acid hydrolysis treatment the acid mix is heated in the presence of added water, under acidic conditions at similar temperatures, and the product may then be neutralized with a suitable base.

Processes of the type described above are disclosed British Pat. Nos. 983, 056, 1,030,648 and 1,042,854.

The original acid mix may also prior to neutralization be given a treatment with strong sulfuric acid (e.g., of 90, 97 or 100% concentration, or oleum) under nonhydrolyzing conditions, to produce a modified acid mix containing more of the anionically active sulfonic acid and a higher delta sultone: gamma sultone ratio, which acid mix yields or neutralization an olefin sulfonate having a lower free oil content.

The color of the olefin sulfonates (whether made from the original acid mix or the modified acid mix) is often not as light as desired, particularly when relatively impure olefin feedstocks are employed. To lighten the color conventional bleaching agents, including such known oxidizing as aqueous sodium hypochlorite or hydrogen peroxide, have been employed. These may be added to the acid mix before or after or during hydrolysis. For example about 1–6 parts of NaOCl per 100 parts of anionically active ingredient may be used preferably at an elevated temperature (e.g., 70°–100°C).

In accordance with one aspect of this invention the acid mix is extracted with aqueous sulfuric acid to form two phases: A sulfuric acid phase containing at most a minor proportion of the anionically active material of the acid mix and an olefin sulfonate phase containing the major proportion of the anionically active material (such as alkenyl sulfonates) and sultones. The olefin sulfonate phase may then be treated in conventional manner to convert its sultone content to anionically active material in well known manner (as by neutralization and alkaline hydrolysis or by acid hydrolysis). It is found that the resulting olefin sulfonates have a considerably lighter color and a lower free oil content than the olefin sulfonates produced in the same way without the sulfuric acid extraction treatment of this invention.

The extraction process of this invention has an additional advantage in that it is found that the lighter colored olefin sulfonates thus produced are more responsive to bleaching and thus can be converted to still lighter products with a smaller amount of bleaching agents (such as an oxidizing agent, e.g., aqueous hydrogen peroxide or sodium hypochlorite) even when very impure olefin feedstocks are used in the sulfonation reaction (e.g., olefin feedstocks containing almost 40% of non-alphaolefinic materials, by mass spectral analysis). In addition the tendency towards color reversion observed, particularly with impure olefin feedstocks, after bleaching is remarkably reduced by the treatments of the instant invention. Thus the practice of this invention not only yields lighter and more bleachable products, but also improves the color stability of the final products after bleaching.

The precise preferred conditions for effecting the extraction step depend, of course, on the particular acid mix used as a starting material. In general, the aqueous sulfuric acid employed for the extraction will contain over 5% and less than about 85% of $H_2SO_4$. In a test of various concentrations of the sulfuric acid, using the acid mix of Example 1 (below), in which 4 parts of the aqueous sulfuric acid was shaken vigorously with 1 part of acid mix at room temperature (e.g., 20°–25°C) for about 5 minutes in a separatory funnel, the use of aqueous sulfuric acid of 25% concentration gave a mixture which separated into two distinct layers on standing 3 minutes in the separatory funnel; with aqeos sulfuric acid of 50% concentration a somewhat longer period was needed; with aqueous sulfuric acid of 65% concentration the separation occurred after about one-half hour; with aqueous sulfuric acid of 80% concentration, the separation occurred overnight; in contrast when 4 parts of water were used in place of the 4 parts of aqueous sulfuric acid no separation occurred even after centrifuging. One particularly desirable concentration of the sulfuric acid is about 75–80%, which permits the use of extraction apparatus whose inner walls are of the less corrosion resistant types of steel. Gravity settling or centrifugation may be used to promote separation of the phases.

The extraction temperature is preferably less than about 50° C, and, for best results, should be high enough to maintain the acid mix in a flowable state. The use of temperatures below about 40° C, preferably about 20°–30°C., is most convenient. The amount of the added aqueous sulfuric acid used as the extractant is usually well within the range of about one-fourth to 10 times (preferably about 1 to 4 times) the weight of acid mix. The acid mix may be given the extraction treatment in two or more stages. For example, in a two stage treatment one half the total amount of the aqueous sulfuric acid is mixed with the acid mix. The phases are then separated and the treatment is repeated, using the second half of the aqueous sulfuric acid. The amount of water in the extractant is generally well over 10% (and preferably well over 20%) of the weight of the acid mix.

Although the preferred extraction procedures of this invention remove color bodies, they extract little, if any of the desired alkenyl sulfonic acids (e.g., less than 5% of anionically active ingredient of the acid mix passes into the aqueous sulfuric acid layer). The long chain sultones (which are precursors of long chain sulfonic acids produced in subsequent treatment, e.g., hydrolysis) are also substantially retained in the acid mix during the extraction.

The separated sulfuric acid phase may be recycled by mixing it with a further quantity of the raw acid mix.

The following examples are given to illustrate this invention further.

EXAMPLE I

An olefin sulfonation acid mix is prepared by continuously reacting an olefin feedstock with $SO_3$ diluted with air in a vertical tubular reactor. The feedstock is a crude $C_{15} - C_{20}$ olefin made by cracking paraffin wax, and has the following composition (as determined by mass spectral analysis):

| | |
|---|---|
| Aromatics | 0.6% |
| Tri-olefins | 0.7% |
| Di-olefins | 9.1% |
| Mono α- olefins | 69.8% |
| Other mono-olefins | 7.9% |
| Paraffins | 11.6% |
| Alcohols | 0.3% |

The average molecular weight of the mono-olefin portion is 241 and the distribution of olefins is:

| | |
|---|---|
| 1.6% | C-14 |
| 12.7% | C-15 |
| 22.7% | C-16 |
| 20.5% | C-17 |
| 18.7% | C-18 |
| 14.9% | C-19 |
| 7.7% | C-20 |
| 1.2% | C-21 |

This feedstock is fed at the rate of 40 lbs. per hour to the top of a vertical tubular falling film reactor 20 feet high so that a film of the olefin flows down the inner wall of the tubular reactor while a gaseous mixture of air and 4% (by volume) of $SO_3$ is injected downward into the center of the tubular reactor at the top thereof at a rate supplying about 15 lbs./hr. of $SO_3$. From the base of the tubular reactor there is discharged continuously a thick chocolate brown colored viscous liquid stream of the sulfonation product (termed acid mix).

The acid mix contains 38.0% by weight of active ingredients (as measured by titration of the acid mix with a standard cetyl trimethylammonium bromide solution) and 6.5 weight % "volatile free oil" (measured by ethylene glycol distillation using substantially the method described in the *Journal of the American Oil Chemists' Society*, vol. 40 (1963) pp. 257–260). The mass spectral analysis of this free oil shows it to contain 53% olefins, 38% paraffins and 3% alcohols (the alcohols may result from splitting of sulfates during distillation). The viscosity at ambient temperature (75°F) of the acid mix is 1000 cps. (measured on a Brookfield viscometer using a No. 3 spindle). The density is 1.036 g./ml. (75°F). The acid mix is divided into two parts One part of the acid mix is shaken vigorously in a separating funnel with 4 parts of aqueous 80% sulfuric acid at room temperature for 2 minutes. The emulsion which forms during the shaking separates completely into two phases after standing for 90 minutes. The originally clear bottom sulfuric acid phase (layer) is discolored and is siphoned off. 3.37 parts of the bottom layer (the sulfuric acid phase) is recovered. Although clear colorless 80% sulfuric acid is used as the starting material, this phase become colored during the extraction process. The density of the bottom phase is 1.685 g/ml. (measured at 75°F) and it anionically active content, as determined by cationic titration, is 0.3%. The "volatile free oil" in the bottom layer amounts to about 0.02 parts; to measure this the separated bottom layer is extracted with petroleum ether, the petroleum ether extract is taken to near dryness on a steam bath and then distilled in the presence of ethylene glycol; this volatile free oil has the following mass spectral analysis: olefins 39%, paraffins 37%, alcohols 1.7%. After separation from the lower layer, the upper layer (which has a viscosity of 525 cps. (75°F) and a density of 1.350 g./ml. (75°F) is neutralized and hydrolyzed in the following manner: A solution of 20% NaOH is added to the upper layer material at ambient temperatures until a pH of 8 is registered on a Beckman pH meter and then 10% more of this NaOH solution is added. The mixture is then heated for 2 hours at 190°–200°F. The resulting aqueous product contains 24% of anionically active ingredient, and an amount of "volatile free oil" equal to 5.3% of the amount of said active ingredient. This free oil has the following composition by mass spectral analysis: olefins 45%, paraffins 42%, alcohols 6%. The aqueous product is yellow-brown and has a color value of 640 Klett (measured on a Klett-Summers Photoelectric Colorimeter by diluting the product with water to give a mixture having a 5% content of anionically active material — henceforth called "5% AI Klett value").

By comparison when one part of the original acid mix is worked up in the same manner except that the sulfuric acid extraction is omitted then the final neutralized dark brown slurry has a 5% AI Klett value of 950. The slurry has a volatile free oil content (based on the content of anionic active ingredient) of 8.4%. The analysis of the volatile free oil is as follows: olefins 51%, paraffins 35%, alcohols 6%. The anionically active material in the product has a lower alkenyl sulfonate content (as evidenced by a lower absorption of hydrogen, and of bromine) and a somewhat higher hydroxyalkane sulfonate content than the product obtained when the extraction step is used.

EXAMPLE 2

An acid mix is produced, as in Example 1, by continuously reacting $SO_3$ at the rate of 15 lbs./hr. with the same crude $C_{15}$–$C_{20}$ olefin at the rate of 40 lbs./hr.

The acid mix is divided into two parts. One part of the acid mix is shaken vigorously with 4 parts of 80% sulfuric acid at room temperature for 2 minutes. The emulsion which forms is subjected to a centrifuge treatment in the following manner. The emulsion is drained into a test tube type centrifuge (Servall Co.) and subjected to 3,500 rpm which gives a centrifugal force at the extreme tip of the tubes of about 1,500 times gravity, and less for other parts of the tube. The emulsion breaks quickly, often within 3 minutes, and the two layers are easily separated.

The purified upper organic layer is converted to an olefin sulfonate slurry by neutralization and hydrolysis in the same manner as cited in example 1. The aqueous neutralized product has the following analysis:- anionically active ingredient 22.5%, volatile free oil (based on active content) 5.1%. The product is brown-yellow in color and has a 5% AI Klett value of 620.

By comparison as in Example 1, when the acid mix is converted directly to an olefin sulfonate slurry by hydrolysis and neutralization without an aqueous sulfuric acid treatment and phase separation, the volatile free oil (based on active content) is 8.4% and the 5% AI Klett value is 950.

EXAMPLE 3

An olefin sulfonation acid mix is prepared by continuously reacting on olefin feedstock with SO$_3$ diluted with air in a reactor as in example one except that the feedstock is a C16–C20 olefin. More specifically, the olefin feedstock (by vendor's analysis) is a 16 18 and 20 carbon chain mixture (made by anionic polymerization of ethylene) in the proportions of 43% C16, 32% C18, and 25% C20 with 89% mono α-olefins, 9% non-α mono-olefins and 2% saturated compounds.

The acid mix is divided into two parts. One part of the acid mix is shaken vigorously in a separatory funnel with 5 parts of 65% sulfuric acid at room temperature for 2 minutes. The emulsion which forms during the shaking separates completely into 2 phases after standing 30 minutes. The purified top sulfonic acid layer is then neutralized and hydrolyzed in the same manner as in Example 1 to produce a substantially colorimproved sodium olefin sulfonate slurry. The 5% Al Klett value of the slurry is 255. By comparison when one part of the original acid mix is worked up in the same manner except that the sulfuric acid treatment and phase separation are eliminated then the final neutralized slurry has 5% Al Klett value of 610.

EXAMPLE 4

100 parts of the neutralized slurry of Example 1 (made from the extracted acid mix) is mixed with 3.5 parts of aqueous 13% NaOCl (equal to 2 parts of NaOCl per 100 parts of anionically active ingredient) and kept at 90%C for one-half hour. The 5% Al Klett value of the resulting product is 205.

In the determination of the anionically active content by cationic titration, there is employed an acidified two-phase mixture containing chloroform, water, methylene blue and the material to be tested. The color concentrates almost exclusively in the lower, chloroform layer. On addition of cetyl trimethylammonium bromide or other long chain cationic reagent and agitation, the color shifts into the upper, aqueous layer; the endpoint of the titration may be taken as the point at which the lower layer is less blue than the upper layer and has a green appearance.

In the foregoing examples, the pressures are atmospheric unless otherwise indicated.

In this specification and claims all proportions are by weight unless otherwise indicated.

As can be seen from the weight of the bottom phase, as compared to the weight of aqueous sulfuric acid added originally in Example 1, the phase separation can yield an organic phase containing some of the added material. The sulfuric acid phase contains color bodies or color-forming materials extracted from the organic phase.

The mono-olefin feedstock used in the reaction with SO$_3$ may contain olefins of the formula RCH=CHR$_1$, where R is an alkyl radical and R$_1$ is alkyl or hydrogen, preferably hydrogen, the olefins having, for example, 8–30 carbon atoms, preferably 12–21 carbon atoms. The feedstock may contain minor amounts of other constituents such as secondary or internal olefins, diolefins, cyclic olefins, aromatics, napthenes and alkanes, and may be produced by cracking of petroleum wax, catalytic polymerization of ethylene, dehydration of long chain alcohols, etc. Best products have thus far been obtained when α-olefins (where R$_1$ is H) constitute a major proportion, e.g. above about 70% and preferably at least 90% of the feedstock. A particularly preferred olefin feedstock contains in the range of about 12 to 21 carbon atoms in the molecule and yields alkenyl sulfonates having excellent detergency properties. Especially good foaming and detersive characteristics have been obtained by the use of a feedstock whose alpha-olefin content consists essentially of compounds of 15 to 18 carbon atoms.

In the sulfonation reaction the inert gas: SO$_3$ mole (volume) ratio is generally in the range of 5:1 to 100:1, preferably at least about 10:1, e.g. 50:1 to 20:1.

Among the inert gases which may be used for dilution of the sulfur trioxide are air and nitrogen, which are preferred, carbon dioxide, sulfur dioxide, low molecular weight paraffinic hydrocarbons, etc. The gaseous sulfur trioxide may be provided by vaporizing a stabilized liquid sulfur trioxide or by using converter gas obtained from a sulfur burner.

In carrying out the initial SO$_3$ - olefin reaction, it is advantageous to maintain intimate contact between a supply of gaseous SO$_3$ and the olefin. This may be conveniently effected in a continuous manner by exposing to the SO$_3$ one or both faces of a thin flowing film of olefin, as by passing the thin film of olefin down the wall of tube into the inner portion of which the SO$_3$ is injected.

During the initial SO$_3$ - olefin reaction the temperature is advantageously maintained below 60°C, a temperature of less than about 50°C and, when feasible, not above about 40°C (e.g. within the range of about 10°–40°C) being preferred. It is usually desirable to work at a temperature at which the sulfonated material produced by the reaction remains in liquid condition. In general, it is desirable to use as low a temperature as possible, e.g., a temperature which is 5°C, or less, above the temperature at which freezing or precipitation takes place. Since the reaction between the SO$_3$ and the olefin is exothermic, it is advantageous to use suitable cooling means; thus, cooling may be effected by passing a cooling medium, such as water, through a jacket surrounding the tubular reactor in which the reaction takes place.

A typical unmodified acid mix (made with a 1:1 SO$_3$: olefin mole ratio) contains in the neighborhood of about 35 mole % anionically active ingredients (based on moles of olefin and measured by titration of the acidic mix with a standard cetyl trimethylammonium bromide solution), the balance being almost all sultones, with minor amounts of volatile free oil, including unreactive materials of the feedstock.

Although the present invention has been described with reference to particular embodiments and examples, it will be apparent to those skilled in the art that variations and modifications can be substituted therefor without departing from the principles and true spirit of the invention. The "Abstract" given above is for the convenience of technical searchers and is not to be used for interpreting the scope of the invention or claim.

What is claimed is:

1. A process for the production of sulfonated olefins, comprising reaction SO$_3$ with an olefin of 8 to 30 carbon atoms to produce an acid mix, adding an aqueous sulfuric acid extractant of 5 to 85% concentration to said acid mix, the amount of water in said extractant being over 10% of the weight of said mix, to produce a mixture comprising a liquid aqueous sulfuric acid phase and an organic phase containing the major proportion of said acid mix and separating said sulfuric acid phase from said organic phase.

2. Process as in claim 1 in which the acid mix and said organic phase contains a sultone of 8 to 30 carbon atoms, and said organic phase is hydrolyzed to convert said sultone to a sulfonic acid.

3. Process as in claim 2 in which said organic phase is hydrolyzed in aqueous medium at a temperature of at least about 80°C.

4. Process as in claim 3 in which the hydrolysis is effected in alkaline medium.

5. Process as in claim 4 in which said organic phase is reacted with aqueous base to produce an alkaline mixture and heated under alkaline conditions to produce a mixture containing alkenyl sulfonates and hydroxyalkane sulfonates.

6. Process as in claim 1 in which the extraction is effected at a temperature of up to about 50°C, and the sulfuric acid phase contains less than about 5% of the anionically active material of the acid mix.

7. Process as in claim 6 in which in the extraction about one-fourth to 10 parts of aqueous sulfuric acid are added per part of acid mix.

8. Process as in claim 7 in which said aqueous sulfuric acid has an $H_2SO_4$ content within the range of about 20 to 80%.

9. Process as in claim 8 in which said $H_2SO_4$ content is about 75 to 80%.

10. Process as in claim 2 which comprises bleaching the sulfonated product by adding an oxidizing agent after the extraction.

11. Process as in claim 10 in which the oxidizing agent comprises aqueous sodium hypochlorite or hydrogen peroxide.

12. Process as in claim 1 in which the separation is effected by a process including settling by gravity.

13. Process as in claim 1 in which the separation is effected by a process including centrifugation.

14. Process as in claim 9 in which the amount of said aqueous sulfuric acid is such that the weight of water therein is over 20% of the weight of the acid mix.

* * * * *